Oct. 30, 1934.   C. H. HAPGOOD   1,978,941
MILKING MACHINE
Filed June 3, 1932   2 Sheets-Sheet 1
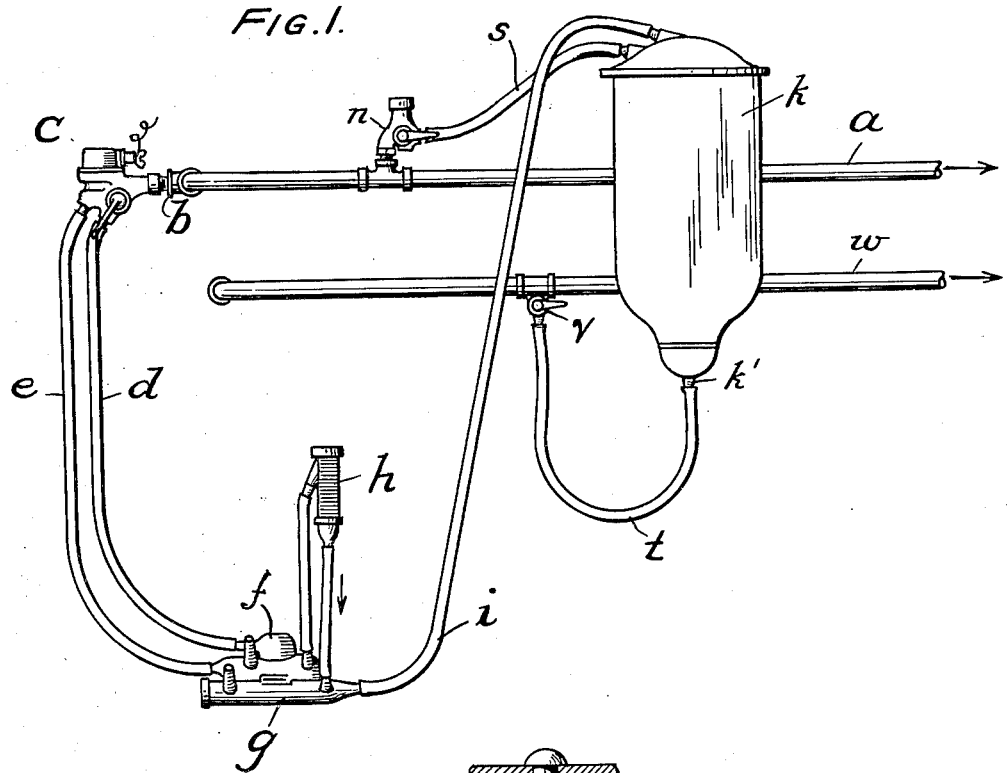
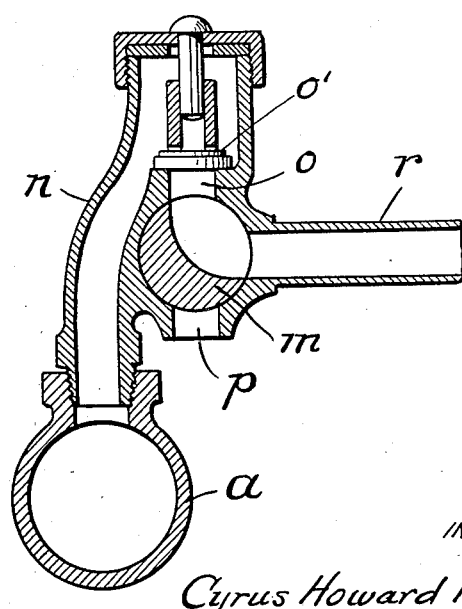
WITNESS:
INVENTOR
Cyrus Howard Hapgood
BY
ATTORNEYS Oct. 30, 1934.  C. H. HAPGOOD  1,978,941
MILKING MACHINE
Filed June 3, 1932  2 Sheets-Sheet 2

INVENTOR
Cyrus Howard Hapgood
BY
Busser and Harding
ATTORNEYS.

Patented Oct. 30, 1934

1,978,941

UNITED STATES PATENT OFFICE 1,978,941

MILKING MACHINE

Cyrus Howard Hapgood, Nutley, N. J., assignor to The De Laval Separator Company, New York, N. Y., a corporation of New Jersey Application June 3, 1932, Serial No. 615,118

4 Claims. (Cl. 31—58)

In a patent issued to me February 23, 1932, No. 1,846,805, there is disclosed a milking machine comprising a milk pipe line, a vacuum pipe line, teat cups and a milk pail; in combination with a single master plug valve which, in the milking position, connects the pail top with a vacuum hose leading to the vacuum pipe line and with the teat cups, and which, in the milk discharge position, connects the pail top with atmosphere and the pail bottom with the milk pipe line. There is also mounted on the vacuum pipe line a vacuum valve which controls the connection of said vacuum hose with the vacuum pipe line.

This milking machine has been improved by the substitution of a different type of master valve and by a different connection between the vacuum pipe line and the milk pail, the improved milking machine being set forth in applications filed of even date herewith, Serial Nos. 615,117 and 615,119.

It is desirable to provide, for smaller installation, a more inexpensive system. Among the comparatively expensive units of the system are the master valves. In the construction embodying the present invention, the master valve is dispensed with. The main features of the present invention, including the vacuum valve, are disclosed in said applications, but the claims therein are limited to combinations of which the master valve is an element.

In the drawings:

Fig. 1 is a diagram of the entire milking machine.

Fig. 2 is a sectional view of the two-way valve on the main vacuum pipe.

Figure 3:
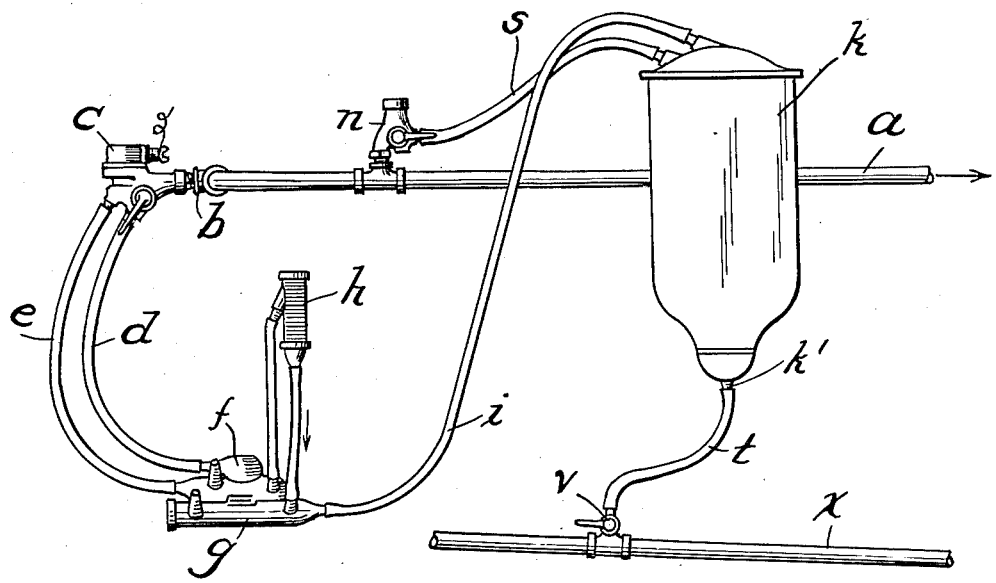
Fig. 3 is a diagram of a modified milking machine.
Figure 4:
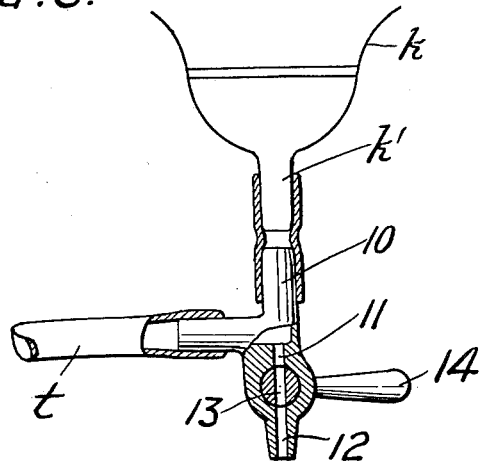
Fig. 4 is a sectional view of the device whereby milk can be withdrawn from the pail for sampling.

Along the vacuum pipe line $a$ are mounted any number of T $b$, to any of which is attached a connector $c$ connected with a vacuum hose $d$ and a pneumatic pulsation hose $e$. The connector $c$ is ported to connect vacuum hose $d$ with the vacuum line $a$ and carries a magnetically operable pneumatic pulsation valve (not shown) whereby pulsation hose $e$ is connected alternately with the vacuum pipe line $a$ and with atmosphere.

The hose $d$ and $e$ connect with the valve chamber $f$ of a claw, the operation of the valve in this chamber being controlled by the pulsations in hose $e$ and producing pulsations in the outer or pulsation chambers of the teat cups $h$. The inner or milk chambers of the teat cups communicate, through the milk chamber $g$ of the claw, with the milk hose $i$ extending to and communicating with the top of a milk pail $k$. The teat cups and claw shown and briefly described may be constructed as shown in the Leitch Patent No. 1,255,186, February 5, 1918. The claw and the vacuum hose $d$ may be omitted and the pulsation hose $e$ connected direct with the pulsation chambers of the teat cups and the milk or teat chambers of the teat cups may connect direct with hose $i$.

On the vacuum pipe $a$ is mounted a casing $n$, which is shaped to afford a passage extending upward from the vacuum pipe and is enlarged at the top and there provided with a downwardly extending port $o$ communicating with a chamber in which a valve $m$ is turnable. The valve chamber has two other ports, namely, an atmospheric port $p$ and a port opening into a nozzle $r$ which is connected, by means of an air hose $s$, with a nozzle opening into the upper part of the pail. The valve $m$ is so ported that when moved into one position it connects nozzle $r$ and hose $s$ with vacuum port $o$ and when moved into the other position it connects nozzle $r$ and hose $s$ with atmospheric port $p$. A check valve $o'$ is seated on the port $o$ and insures complete closure of port $o$ except when valve $m$ is in position to connect port $o$ with nozzle $r$ and the pressure in nozzle $r$ is greater than in vacuum pipe $a$.

The bottom of milk pail $k$ has a nozzle $k'$ to which is attached one end of a milk hose $t$. The other end of hose $t$ extends to a milk pipe line $w$, communication therewith being controlled by a valve $v$. The milk pipe, along its length, is similarly connected with any number of pails.

In order to milk, valve $v$ is closed, valve $m$ is moved into position to connect hose $s$ with the vacuum pipe line, and the teat cups are applied to a cow. Milk then flows through hose $i$ into the milk pale $k$ until the milking of the cow is completed. The milk in pail $k$ may then be weighed or measured by known means.

The milk is then transferred to the milk pipe line by opening valve $v$, the valve $m$ having been previously moved into position to connect hose $s$ with the atmosphere, in order to allow the removal of the teat cups from the cow. The milk in pail k being then under atmospheric air pressure, and the tank, reservoir, pail or other receiver (not shown) communicating with the milk pipe line $w$ being under vacuum, the milk is discharged from the pail into the milk pipe line, whence it flows into the receiver.

These operations are repeated in each pail until the entire herd of cows is milked, after which the entire milking system is flushed out with cold water and then with steam by opening the connections between the milk pipe line $w$ and hose $t$ and between hose $s$ and the atmosphere, the washing fluid thus flowing from the milk receiver through the milk pipe line $w$, hose $t$, pail $k$, hose $i$ to the teat cups and through hose $s$ to the atmosphere.

In Fig. 3 a modification is shown wherein the level of the milk pipe line $x$ is lowered below the level of the pail (or the pail raised above the milk pipe line $x$); the milk pipe line being inclined downward toward the milk receiver (not shown). In this construction the milk pipe line and receiver need not be under vacuum, the milk being discharged from the pail, when valve $v$ is opened, by gravity.

At intervals it is desirable to sample the milk in each container. To enable this to be conveniently done, hose $t$ is detached from nozzle $k'$. There is then applied to nozzle $k'$ an angular tube 10, one arm of which is connected with nozzle $k'$, the hose $t$ then being attached to the other arm. Tube 10 carries a valve chamber having an upwardly extending port 11 communicating with the tube 10 and a downwardly extending port 12 opening to the atmosphere. A valve 14 in the valve chamber is turnable into position to connect a passage 13 therein with ports 11 and 12. Before sampling, the valves $v$ and 14 are closed and valve $m$ is opened to vacuum, the tube $i$ being bent at a sharp angle to prevent passage of air. Valve 14 is then opened, allowing air to flow through port 12, passage 13, port 11, tube 10 and nozzle $k'$ into the pail $k$, stirring the milk therein so as to insure securing a representative sample of the milk. Valve $m$ is then opened to atmosphere, and milk outflows from pail $k$ through nozzle $k'$, tube 10, port 11, passage 13, and port 12 into a suitable receptacle. As soon as the desired quantity of milk is expelled, valve 14 is closed and valve $v$ is opened to discharge the remainder of the milk into vacuum line $w$. At the conclusion of sampling, hose $t$ is detached, tube 10 removed and hose $t$ attached direct to nozzle $k'$.

It will be understood that when reference is made to establishing connections with vacuum and atmosphere respectively, I mean to include as an equivalent any two substantially different absolute pneumatic pressures.

What I claim and desire to protect by Letters Patent is:

1. In a milking machine, the combination with a milk pipe line, a vacuum pipe line, a teat cup unit, a milk pail, a milk conduit connecting the bottom of the pail and the milk pipe line, a milk conduit connecting the teat cup unit and the top of the pail, an air conduit communicating with the top of the pail, and a valve controlling the flow of milk from the milk pail through the first named conduit to the milk pipe line, of a casing mounted on the vacuum pipe line and having an air passage communicating therewith; a valve chamber carried by the casing having an atmospheric port, a port opening into said air conduit and a port communicating with said passage; a valve in said valve chamber turnable to connect said air conduit with either the atmosphere or the passage in the casing, and a check valve between said passage and the port communicating therewith.

2. In a milking machine, the combination of a milk pipe line, a vacuum pipe line, a teat cup unit, a milk pail, a milk conduit connecting the teat cups and the top of the pail, an air conduit connecting the vacuum pipe line and the top of the pail, a milk discharge nozzle at the bottom of the pail, a milk hose connecting said nozzle and the milk pipe line, valve mechanism movable into one position to connect said air conduit with the vacuum pipe line and close communication through said hose from the pail to the milk pipe line and movable into another position to connect said air conduit with the atmosphere and open communication through said hose from the pail to the milk pipe line; said hose being detachable from said nozzle, a separate tube which is attachable at one end to said nozzle and to the other end of which said hose is attachable, a valve chamber carried by said tube and having an atmospheric and milk-escape port, and a valve in said chamber which is turnable into position to connect said tube with said port.

3. In a milking machine, the combination with a vacuum pipe, a milk pail and an air conduit communicating with the top of the pail, of a casing mounted on the vacuum pipe and having an air passage communicating therewith, a valve carried by the casing and provided with an atmospheric port, with a port opening into said air conduit and with a port communicating with said passage, and a valve in said valve chamber provided with a passage and turnable to connect, through said passage, the first named port with either of the other two ports, a check valve on said passage and seated against the port that communicates with the passage in the casing, and a guide for said check valve secured to said casing.

4. In a milking machine, the combination with a vacuum pipe line and a milk pail, of an air conduit communicating with the top of the pail, an air conduit communicating with the vacuum pipe line, a manually operable valve at the junction of said conduits and movable into one position to connect them and into another position to connect the first named air conduit with the atmosphere, and an automatic valve in the second named air conduit adapted to close it to passage of air when the manually operable valve is in position to connect said air conduits unless the pressure in the first named conduit is greater than in the vacuum pipe line.

CYRUS HOWARD HAPGOOD.